United States Patent
Leverenz

[11] 3,954,395
[45] May 4, 1976

[54] MIXTURES OF DYESTUFFS

[75] Inventor: Klaus Leverenz, Leverkusen, Germany

[73] Assignee: Bayer Aktiengesellschaft, Leverkusen, Germany

[22] Filed: July 13, 1973

[21] Appl. No.: 378,810

[30] Foreign Application Priority Data
July 13, 1972   Germany............................ 2234465

[52] U.S. Cl. .................................... 8/26; 8/41 C; 260/207.1
[51] Int. Cl.² ................... C09B 27/00; C09B 45/48; D06P 1/00; D06P 3/00
[58] Field of Search.............. 8/26, 41 C; 260/207.1

[56] References Cited
UNITED STATES PATENTS

| | | | |
|---|---|---|---|
| 2,312,398 | 3/1943 | Felix ......................................... 8/26 |
| 3,122,410 | 2/1964 | Mueller et al. ........................ 8/26 X |
| 3,342,804 | 9/1967 | Mueller................................ 8/26 X |
| 3,503,955 | 3/1970 | Genta .................................. 8/26 X |
| 3,536,439 | 10/1970 | Brachel et al......................... 8/41 C |
| 3,579,497 | 5/1971 | Ramanathan et al......... 260/207.1 X |
| 3,640,996 | 2/1972 | Sturm et al. ....................... 8/41 C X |
| 3,642,767 | 2/1972 | Hahn ........................... 260/207.1 X |
| 3,772,267 | 11/1973 | Cornelius et al.................. 8/41 C X |
| 3,775,049 | 11/1973 | Wolfrum et al...................... 8/26 X |
| 3,845,034 | 10/1974 | Brachel et al.................... 260/207.1 |

Primary Examiner—Leland A. Sebastian
Assistant Examiner—T. S. Gron
Attorney, Agent, or Firm—Plumley & Tyner

[57] ABSTRACT

Dyestuff mixtures of at least two different dyestuffs of the general formula

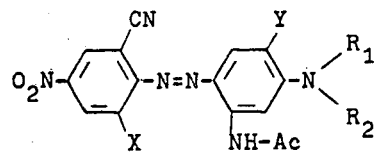

in which
X = CN, $NO_2$ or alkylsulphonyl
Y = hydrogen, methyl, ethoxy or methoxy
$R_1$ = hydrogen or alkyl
$R_2$ = $C_1$–$C_4$-alkyl or an optionally substituted phenyl radical or phenylalkyl radical
Ac = acyl.

Using these mixtures for dyeing of polyester fibres deep clear blue dyeings with good general fastness properties are obtained.

4 Claims, No Drawings

MIXTURES OF DYESTUFFS

The present invention relates to dyestuff mixtures of at least two different dyestuffs of the general formula

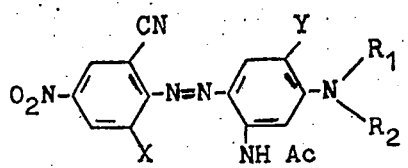

(I)

in which
X represents CN, $NO_2$ or $C_1$–$C_4$-alkylsulphonyl,
Y denotes hydrogen, methyl, ethoxy or methoxy,
$R_1$ denotes hydrogen or $C_1$–$C_4$-alkyl,
$R_2$ represents $C_1$–$C_4$-alkyl or an optionally chlorine-substituted or methyl-substituted phenyl radical or phenylalkyl radical with 1 – 2 C atoms in the alkyl group, and
Ac represents —CO—Q or —$SO_2$—Q,
wherein
Q denotes $C_1$–$C_4$-alkyl or an optionally chlorine-substituted or methyl-substituted phenyl radical or phenylalkyl radical with 1 – 2 C atoms in the alkyl radical
and their manufacture and use for dyeing, padding and printing polyester materials.

Particularly suitable mixtures are those of at least two different dyestuffs which correspond to the general formula II

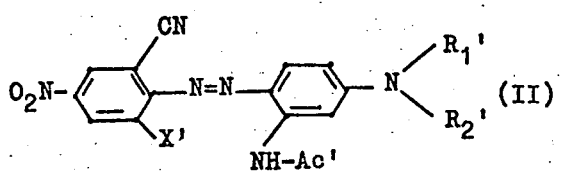

(II)

wherein
X' represents CN, $NO_2$, $SO_2CH_3$ or $SO_2CH_2CH_3$,
Ac' represents

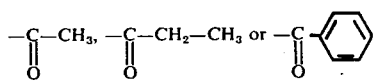

$R_1'$ represents a $C_2$–$C_4$-alkyl radical,
$R_2'$ represents a $C_1$–$C_4$-alkyl radical or the

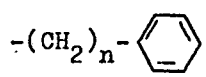

group and
n represents 0, 1 or 2
and the components of the mixture differ in at least one of the substituents $R_1'$ or $R_2'$, as well as mixtures of at least two different dyestuffs which correspond to the general formula III

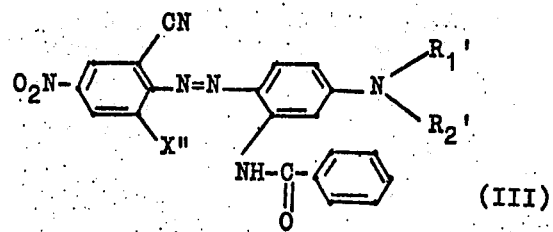

(III)

wherein
X'' represents CN or $NO_2$,
$R_1'$ and $R_2'$ have the abovementioned meaning and the components of the mixture differ at least in one of the substituents $R_1'$ or $R_2'$.

Particularly suitable mixtures of at least two different dyestuffs are furthermore those which correspond to the general formula IV

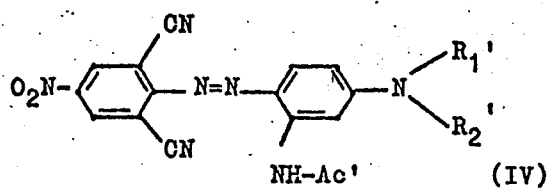

(IV)

wherein
$R_1'$, $R_2'$ and Ac' have the abovementioned meaning and
the components of the mixtures differ in at least one of the radicals $R_1'$ or $R_2'$, as well as those of the formula V:

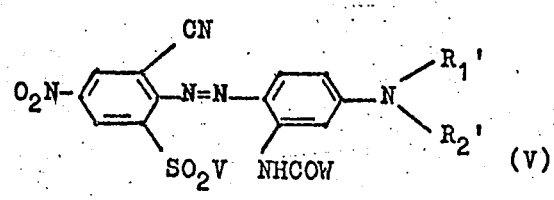

(V)

wherein
V denotes a $C_1$–$C_4$-alkyl radical,
W denotes a $C_1$–$C_4$-alkyl radical or a phenyl radical and
$R_1'$ and $R_2'$ have the abovementioned meaning
with the components of the mixture differing at least in one of the radicals V, $R_1'$ or $R_2'$.

In the mixtures according to the invention, the ratio of the individual components can vary within relatively wide limits. In general, the minimum proportion by weight of a component of the mixture is 5%, but preferably 10%. In the two-component mixtures, the preferred quantity ratio is between 70 and 30% for one component and 30 and 70% for the other component.

A preferred quantity ratio for three-component mixtures is, for example, about 10 : 40 : 50.

The dyestuff mixtures according to the invention, of the formula I, can be manufactured according to various processes.

One process is characterised in that the individual dyestuffs are thoroughly mixed with one another in the desired ratio — preferably with addition of dispersing agents.

This mixing process is appropriately carried out in suitable mills, for example ball mills and sand mills as well as kneaders.

Possible dispersing agents are in particular those of anionic nature, such as are described, for example, in German Patent Specification 1,813,180. As examples there may be mentioned: condensation products of naphthalene, formaldehyde and sulphuric acid, as well as lignin sulphonates.

A further process for the manufacture of the new dyestuff mixtures is characterised in that diazotised amines of the formula VI

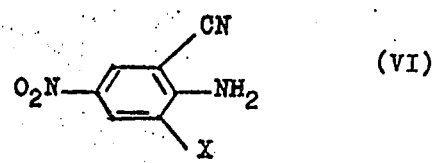

in which
X has the abovementioned meaning are combined with coupling components of the formula VII

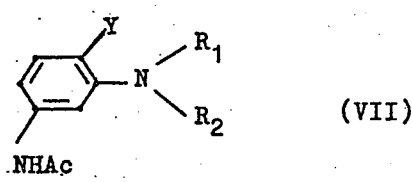

in which
Y, Ac, $R_1$ and $R_2$ have the abovementioned meaning with the proviso that at least one of the components VI or VII is present as a mixture of at least two compounds of the indicated formula.

Finally it is possible to manufacture the dyestuff mixtures according to the invention by replacing the substituent Z in a manner which is in itself known, by a nitrile, nitro or $C_1$-$C_4$-alkylsulphonyl group in mixtures of at least two different azo compound of the formula

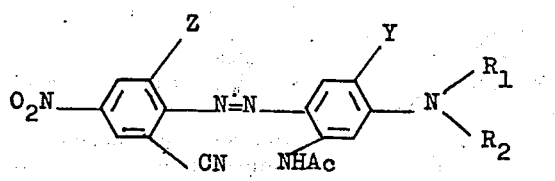

in which
Z represents a halogen atom, preferably bromine, and
Y, $R_1$, $R_2$ and Ac have the abovementioned meaning or replacing the substituent Z by a nitrile group in mixtures of at least two different azo compounds of the formula

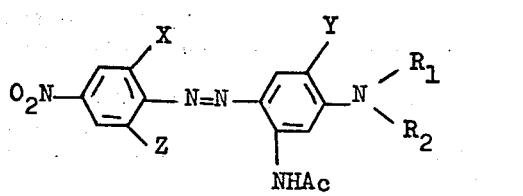

in which $R_1$, $R_2$, X, Y, Z and Ac have the abovementioned meaning.

Dyestuff mixtures of the formula IV can be manufactured by replacement of Z by the CN group in

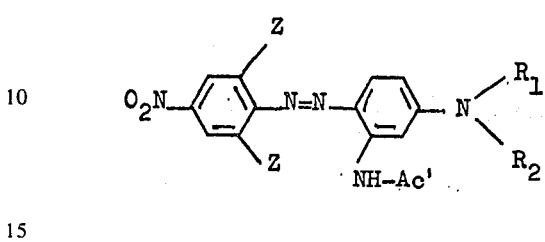

Preparative details with regard to these replacement reactions are described, for example, in the following patent specifications:

Halogen → nitrile replacement: British Patent Specification 1,125,683;

Halogen → nitro replacement: British Patent Specification 1,226,950;

Halogen → alkylsulphonyl replacement: British Patent Specification 1,255,367.

In carrying out the dyeing processes industrially, the dyestuff mixtures according to the invention are preferably used in a finely dispersed form in the presence of customary anionic dispersing agents and optionally with the addition of protective colloids, anti-foaming agents and other dyeing auxiliaries.

The dyestuff mixtures according to the formula I are suitable for dyeing both by the so-called exhaustion process (at the boil and with addition of carriers) or by the so-called high temperature process (120° – 130°C under pressure). In addition, the new dyestuff mixtures can be employed in the known thermosol process wherein the material to be dyed is impregnated, at temperatures below 60°C, with an aqueous suspension of the dyestuff mixture which additionally contains 1 to 50% of urea and/or a thickener such as, for example, sodium alginate. The material is then squeezed out to a weight increase of 50 – 100%.

In order to fix the dyestuffs in the fabric impregnated in this way, the impregnated material is first dried, for example in a stream of warm air, and is then heated briefly, for example for 60 – 90 seconds, to temperatures between 150° and 220°C.

To improve the fastness properties of the dyeings thus produced, especially to improve the fastness to rubbing, fastness to sublimation and/or fastness to light, an after-treatment process can follow, in which non-fixed parts of the dyestuff are removed from the surface of the fabric by one of the customary washing and/or reduction processes.

Using the dyeing processes described, deep clear blue dyeings which are distinguished by good general fastness properties, especially good fastness to washing, rubbing, light and sublimation, can be produced with good colour yield.

In the examples which follow, parts denote parts by weight.

EXAMPLE 1

A mixture of 50 parts of the dyestuff of the formula A and 50 parts of the dyestuff of the formula B

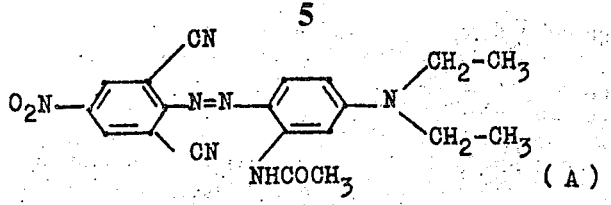

(A)

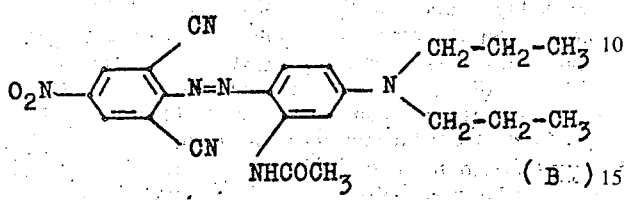

(B)

is ground wet, with addition of 70 parts of ligninsulphonates, to give a paste which contains 25% of dyestuff.

2 parts of this dyestuff dispersion are introduced, at 40°C, into 4,000 parts of water containing 4 parts of ligninsulphonate, 20 parts of o-creosotic acid methyl ester and 4 parts of sodium dihydrogen phosphate. The pH-value of this dyebath is adjusted to 4.5 by adding acetic acid. 100 parts of a fabric of polyethyleneterephthalate fibres are introduced into this bath, the temperature is raised to 100°C over the course of approx. 20 minutes and dyeing is carried out for 60 – 90 minutes at this temperature. Thereafter the fabric is carefully rinsed and washed. The resulting deep, clear blue dyeing is distinguished by excellent fastness to washing, rubbing, light and sublimation.

Compared with the individual components A or B (100%) the mixture used in this example is distinguished by a distinctly higher build-up capacity (130%).

A clear, somewhat reddish-tinged blue dyeing with very good fastness to sublimation and to light is obtained according to this example when using cellulose triacetate as the substrate.

The dyestuff mixture can be manufactured as follows: 86 parts of 2,6-dibromo-4-nitro-aniline are introduced at approx. 35°C, whilst stirring, into nitrosylsulphuric acid manufactured from 230 parts of 96% strength sulphuric acid and 14.5 parts of sodium nitrite and the solution is stirred for 2 hours at this temperature. The solution of the diazonium salt, thus obtained, is added to a solution of 31 parts of 3-diethylaminoacetanilide, 35 parts of 3-dipropylaminoacetanilide, 42 parts of 48% strength sulphuric acid and 1 part of amidosulphonic acid in water at 0° – 5°C, whilst simultaneously adding ice. After completion of coupling, the dyestuff is filtered off, washed until neutral and dried. 77 parts of this product are dissolved in 125 parts of dimethylformamide and 25 parts of pyridine and reacted with 26 parts of copper-(I) cyanide at 90°C. The reaction products are precipitated with 50 parts of water and filtered off. To remove the copper-(I) bromide, the product is introduced into a solution of 62 parts of iron-(III) chloride and 75 parts of 30% strength hydrochloric acid in 400 parts of water, the mixture is stirred overnight and the dyestuff mixture which remains is filtered off and washed with water until neutral.

EXAMPLE 2

A tinctorially similar result, especially with regard to colour shade, fastness properties and build-up capacity on polyester fibre fabrics is achieved with a dyestuff mixture of the following composition:

40 parts of the dyestuff of the formula A,
10 parts of the dyestuff of the formula B and
50 parts of the dyestuff of the formula C

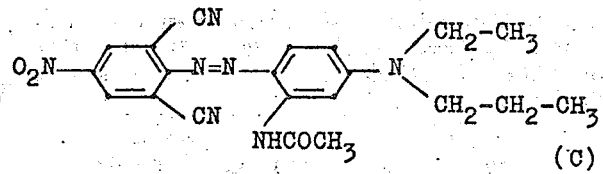

(C)

This dyestuff mixture can be manufactured by replacing the coupling components used in Example 1 by a mixture of approx. 28 parts of 3-(diethylamino)-acetanilide, approx. 33 parts of 3-(N-ethyl-N-propylamino)-acetanilide and approx. 7 parts of 3-(dipropylamino)-acetanilide. This mixture of the coupling components is obtainable, for example, by alkylation of 3-amino-acetanilide with a mixture of ethyl chloride and propyl chloride in ethanol in the presence of sodium carbonate at 130°C.

EXAMPLE 3

2 parts of a dyestuff dispersion manufactured analogously to Example 1 from 60 parts of the dyestuff of the formula D, 40 parts of the dyestuff of the formula E and 300 parts of spray-dried sulphite cellulose waste liquor

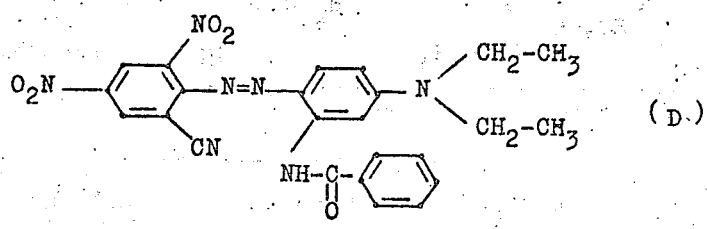

(D)

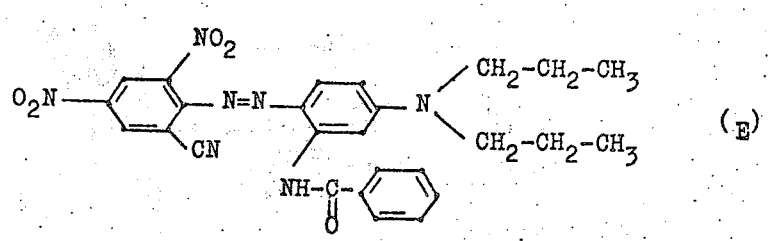

(E)

are introduced, at 40°C, into 3,000 parts of water in which 3 parts of sodium dihydrogen phosphate and 3 parts of a condensation product of naphthalene, formaldehyde and sulphuric acid have been dissolved beforehand. The mixture is then adjusted to a pH-value of 4.5 with acetic acid and 100 parts of a fabric of polyethyleneterephthalate fibres are introduced into this dyebath. Thereafter dyeing is carried out for 1 hour at 130°C in an autoclave. The fabric is then carefully rinsed and washed. A clear, deep blue dyeing of excellent fastness to sublimation and very good fastness to light is obtained.

Compared with the individual components D and E (100%), the mixture used in this example has a distinctly better build-up capacity (115 – 120%).

To manufacture this dyestuff mixture, a diazo component in Example 1 is replaced by 76 parts of 2,4-dinitro-6-bromo-aniline and the coupling component used is a mixture of 48 parts of 3-diethylamino-benzanilide and 36 parts of 3-dipropylamino-benzanilide. 86 parts of the product thereby obtained, in 125 parts of dimethylformamide and 12.5 parts of pyridine, are reacted with 13 parts of copper-(I) cyanide and treated further as described in Example 1.

EXAMPLE 4

30 parts of a dyestuff dispersion obtained from 50 parts of the dyestuff of the formula F, 40 parts of the dyestuff of the formula G, 10 parts of the dyestuff of the formula H

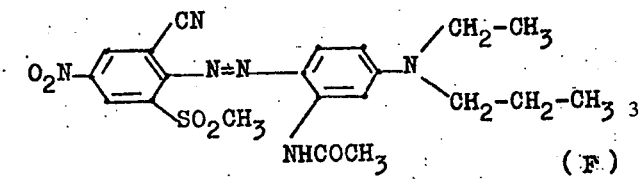
(F)

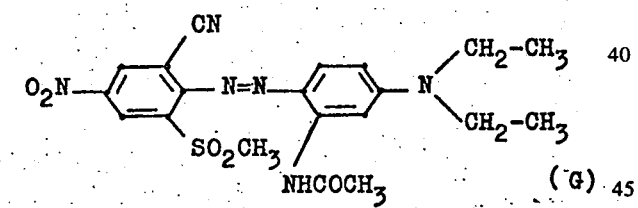
(G)

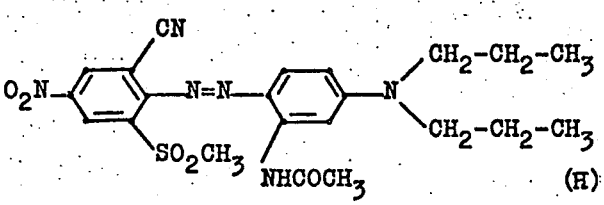
(H)

and 300 parts of a condensation product of naphthalene, formaldehyde and sulphuric acid, 60 parts of urea and 2 parts of sodium alginate are stirred into 1,000 parts of water. A fabric of polyethyleneterephthalate fibres is padded with this liquor in the usual manner at room temperature, dried in a stream of warm air at approx. 80°C and finally fixed for 60 seconds at 220°C. Thereafter the fabric is thoroughly rinsed and soaped at the boil. A clear blue dyeing of excellent fastness to sublimation and very good fastness to rubbing and to light results. Compared to the individual components G and H (100%) the dyestuff mixture used in this example possesses a substantially better build-up capacity (120 – 130°%). Furthermore, the resulting depth of colour, when using the mixture in the temperature range of between 190° and 220°C, is largely independent of the fixing temperature whilst when using the individual components G or H distinct differences in depth of colour are observed in this temperature range. Uneven dyeings can result therefrom even at temperature differences on the fabric surface of only 10°C, which frequently occur in thermofixing apparatuses.

The mixture of the dyestuffs F, G and H is furthermore outstandingly suitable for dyeing mixed fabrics of polyester fibres and cotton fibres by this process, since the cotton component is not dyed or slight soiling can be removed easily and completely for example by a reductive after-treatment process.

To manufacture the dyestuff mixture used in this example, 86 parts of (2-amino-3-bromo-5-nitrophenyl)-methylsulphone are coupled, analogously to Example 1, to a mixture of 33 parts of 3-(N-ethyl-N-propylamino)-acetanilide, 28 parts of 3-(diethylamino)-acetanilide and 7 parts of 3-(dipropylamino)-acetanilide. 75 parts of the product thereby obtained are reacted, analogously to Example 3, with 13 parts of copper-(I) cyanide in 200 parts of dimethylformamide and 15 parts of pyridine and the mixture is then worked-up analogously to Example 1.

Similar dyeings of comparable depth of colour are obtained when using a dyestuff mixture of 60 parts of G and 40 parts of H.

The table which follows lists further dyestuff mixtures of the general formula I which can be manufactured analogously to the instructions of examples 1 – 4. The build-up capacity indicated in the last column relates to the main constituent of the mixture.

Unless otherwise indicated Y = H.

| Ex. No. | X | $R_1$ | $R_2$ | Acyl | Mixing ratio | Colour shade on polyester fibres | Build-up capacity (%) |
|---|---|---|---|---|---|---|---|
| 5 | CN | —CH₂—CH₃ | —CH₂—CH₃ | —C(=O)—C₆H₅ | 60 | blue | 120 – 130 |
|   | CN | —CH₂—CH₂—CH₃ | —CH₂—CH₂—CH₃ | —C(=O)—C₆H₅ | 40 |  |  |
| 6 | CN | —CH₂—CH₃ | —CH₂—CH₃ | —SO₂—CH₃ | 70 | navy | 120 |
|   | CN | —CH₂—CH₂—CH-₂—CH₃ | —CH₂—CH₂—CH₂—CH₃ | —SO₂—CH₃ | 30 | blue |  |
| 7 | CN | —CH₂—CH₃ | —CH₂—C₆H₅ | —C(=O)—CH₃ | 65 | blue | 125 – 130 |
|   | CN | —CH₂—CH₂—CH₃ | —CH₂—C₆H₅ | —C(=O)—CH₃ | 35 |  |  |

-continued

| Ex. No. | X | R₁ | R₂ | Acyl | Mixing ratio | Colour shade on polyester fibres | Build-up capacity (%) |
|---|---|---|---|---|---|---|---|
| 8 | NO₂ | —CH₂—CH₃ | —CH₂—CH₂—C₆H₅ | —CO—CH₂—CH₃ | 60 | blue | 120 |
|   | NO₂ | —CH₂—CH₂—CH₃ | —CH₂—C₆H₅ | —CO—CH₂—CH₃ | 40 |   |   |
| 9 | NO₂ | —CH₂—CH₃ | —CH₂—CH₃ | —CO—CH₂—CH₃ | 50 | blue | 115 |
|   | NO₂ | —CH₂—CH₂—CH₃ | —CH₂—CH₂—CH₃ | —CO—CH₂—CH₃ | 50 |   |   |
| 10 | NO₂ | —CH₃ | —C₆H₅ | —CO—CH₃ | 55 | blue | 120 |
|   | NO₂ | —CH₂—CH₃ | —C₆H₅ | —CO—CH₃ | 45 |   |   |
| 11 | CN | —CH₂—CH₂—CH₃ | —CH₂—CH₂—CH₃ | —CO—C₆H₄—CH₃ | 70 | blue | 125 – 130 |
|   | NO₂ | —CH₂—CH₃ | —CH₂—CH₃ | —CO—C₆H₄—CH₃ | 30 |   |   |
| 12 | —SO₂—CH₃ | —CH₂—CH₃ | —CH₂—CH₃ | —CO—CH₃ | 75 | blue | 120 – 130 |
|   | —SO₂—CH₂—CH₃ | —CH₂—CH₂—CH₂—CH₃ | —CH₂—CH₃ | —CO—CH₃ | 25 |   |   |
| 13 | —NO₂ | —CH₂—CH₃ | —CH₂—CH₃ | —CO—C₆H₄—Cl | 40 | blue | 115 – 120 |
|   | —NO₂ | —CH₂—CH₃ | —CH₂—CH₂—CH₃ | —CO—C₆H₄—Cl | 50 |   |   |
|   | —NO₂ | —CH₂—CH₂—CH₃ | —CH₂—CH₂—CH₃ | —CO—C₆H₄—Cl | 10 |   |   |
| 14 | —CN | —CH₂—CH₃ | —CH₂—CH₃ | —CO—CH₂—C₆H₅ | 55 | blue | 125 – 130 |
|   | —CN | —CH₂—CH₃ | —CH₂—CH₂—CH₂—CH₃ | —CO—CH₂—C₆H₅ | 35 |   |   |
|   | —CN | —CH₂—CH₂—CH₂—CH₃ | —CH₂—CH₂—CH₂—CH₃ | —CO—CH₂—C₆H₅ | 10 |   |   |
| 15 | NO₂ | —CH₂—CH₃ | —CH₂—CH₃ | —CO—CH₂—CH₃ | 35 | blue | 120 – 125 |
|   | SO₂CH₃ | —CH₂—CH₂—CH₃ | —CH₂—CH₂—CH₃ | —CO—CH₃ | 65 |   |   |

| Example No. | X | Y | $R_1$ | $R_2$ | Acyl | Mixing ratio | Colour shade on polyester fibres. | Build-up Capacity (%) |
|---|---|---|---|---|---|---|---|---|
| 16 | CN | $CH_3$ | H | $-CH_2-CH_2-CH_3$ | $-\underset{\underset{O}{\|\|}}{C}-CH_3$ | 70 | blue | 115 |
|  | CN | $CH_3$ | H | $-CH_2-CH_2-CH_2-CH_3$ | $-\underset{\underset{O}{\|\|}}{C}-CH_3$ | 30 |  | 120 |
| 17 | CN | $OCH_3$ | $-CH_2-CH_3$ | $-CH_2-CH_3$ | $-\underset{\underset{O}{\|\|}}{C}-CH_3$ | 50 | blue-green | 120 |
|  | CN | $OCH_3$ | $-CH_2-CH_2-CH_3$ | $-CH_2-CH_2-CH_3$ | $-\underset{\underset{O}{\|\|}}{C}-CH_3$ | 50 |  |  |
| 18 | $NO_2$ | $OC_2H_5$ | $-CH_2-CH_3$ | $-CH_2-C_6H_5$ | $-\underset{\underset{O}{\|\|}}{C}-CH_3$ | 60 | blue-green | 115 |
|  | $NO_2$ | $OC_2H_5$ | $-CH_2-CH_2-CH_3$ | $-CH_2-C_6H_5$ | $-\underset{\underset{O}{\|\|}}{C}-CH_3$ | 40 |  |  |
| 19 | $SO_2CH_3$ | $OCH_3$ | $-CH_2-CH_3$ | $-CH_2-CH_2-CH_3$ | $-\underset{\underset{O}{\|\|}}{C}-CH_3$ | 55 | blue-green | 125 |
|  | $SO_2CH_3$ | $OCH_3$ | $-CH_2-CH_3$ | $-CH_2-CH_3$ | $-\underset{\underset{O}{\|\|}}{C}-CH_3$ | 25 |  |  |
|  | $SO_2CH_3$ | $OCH_3$ | $-CH_2-CH_2-CH_3$ | $-CH_2-CH_2-CH_3$ | $-\underset{\underset{O}{\|\|}}{C}-CH_3$ | 20 |  |  |

I claim:

1. Dyestuff mixtures of at least two different dyestuffs in which each dyestuff is present in at least 5% by weight of the mixture, said dyestuffs having the formula

wherein
X' represents CN, $NO_2$, $SO_2CH_3$ or $SO_2CH_2CH_3$,
Ac' represents

$R_1'$ represents a $C_2-C_4$-alkyl radical,
$R_2'$ represents a $C_1-C_4$-alkyl radical or the

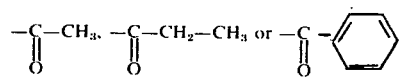

group and
n represents 0, 1 or 2
and the components of the mixture differ in at least one of the substituents $R_1'$ or $R_2'$.

2. Dyestuff mixtures of claim 1 of at least two different dyestuffs of the general formula

wherein
X" represents CN or $NO_2$.

3. Dyestuff mixtures of claim 1 of at least two different dyestuffs of the general formula

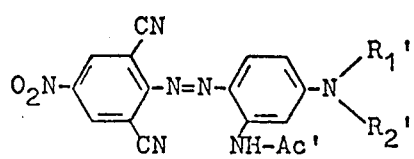

4. Dyestuff mixtures of at least two different dyestuffs in which each dyestuff is present in at least 5% by weight of the mixture, said dyestuffs having the formula

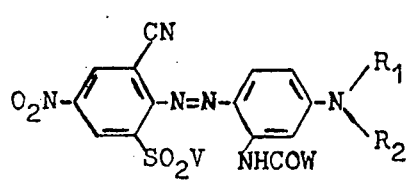

wherein
V denotes a $C_1-C_4$-alkyl radical,
W denotes a $C_1-C_4$-alkyl radical or a phenyl radical
$R_1'$ denotes a $C_2-C_4$-alkyl radical, $R_2'$ denotes a $C_1-C_4$-alkyl radical or the

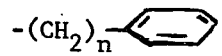

group and n denotes 0, 1 or 2 and the components of the mixture differ in at least one of the substituents $R_1'$ or $R_2'$.

* * * * *